(12) United States Patent
McPherson et al.

(10) Patent No.: US 7,199,700 B1
(45) Date of Patent: Apr. 3, 2007

(54) BREATHMINDER

(75) Inventors: Janice A. McPherson, Merritt Island, FL (US); Joel N. McPherson, Merritt Island, FL (US)

(73) Assignee: McPherson Enterprises, LLC, Merritt Island, FL (US)

( * ) Notice: Subject to any disclaimer, the term of this patent is extended or adjusted under 35 U.S.C. 154(b) by 272 days.

(21) Appl. No.: 10/950,247

(22) Filed: Sep. 24, 2004

(51) Int. Cl.
*H04B 3/36* (2006.01)

(52) U.S. Cl. .............................. 340/407.1; 340/309.16; 340/573.1; 368/10

(58) Field of Classification Search ............. 340/407.1, 340/309.15, 573.1; 368/10
See application file for complete search history.

(56) References Cited

U.S. PATENT DOCUMENTS

| | | | |
|---|---|---|---|
| 4,258,354 A | 3/1981 | Carmon | 340/309.4 |
| 4,493,043 A | 1/1985 | Forbath | 364/569 |
| 4,617,525 A | 10/1986 | Lloyd | 340/573 |
| 5,861,797 A | 1/1999 | Becker | 340/309.3 |
| 5,899,204 A | 5/1999 | Cochran | 128/205.23 |
| 6,075,755 A | 6/2000 | Zarchan | 368/10 |
| 6,198,695 B1 | 3/2001 | Kirton | 368/10 |
| 6,985,869 B1* | 1/2006 | Stoll et al. | 705/2 |
| 2002/0012291 A1* | 1/2002 | Robinett | 368/73 |

OTHER PUBLICATIONS http://www.invisibleclock.com/Time Now Corporation The Invisible Clock 11/112003, p. 1 of-7.

* cited by examiner

*Primary Examiner*—Daniel Wu
*Assistant Examiner*—Travis R. Hunnings
(74) *Attorney, Agent, or Firm*—Brian S. Steinberger; Law Offices of Brian S. Steinberger, P.A.

(57) ABSTRACT

Breathing reminder device and method of using the device. The device is housed in a case sized and adapted to be worn discreetly under the clothing of a user. The case holds a microprocessor, a tactile alarm, and batteries, which power the microprocessor and the tactile alarm. The device is devoid of any display or control mechanism other than a single "On/Off" switch. The novel device and method can include activating a vibratory sequence every selected time period. The vibratory sequence can include an approximately 4 second continuous vibration followed by an approximately 8 second pause followed by another approximately 4 second vibration. Every approximately 15 minutes the vibratory sequence is automatically repeated.

12 Claims, 7 Drawing Sheets

BREATHMINDER

This invention relates to electronic reminders, in particular to a pre-programmed battery powered device and method of operating a device that is worn by persons desiring to learn and practice regulated breathing for relief of anxiety and/or stress-related conditions.

BACKGROUND AND PRIOR ART

There are approximately twenty million adults and children in the United States with Social Anxiety Disorder. Individuals with this disorder have been known to suffer from chronic and often unfounded fears, tension, and breathing irregularities along with a multitude of physical symptoms, such as fatigue, trembling, muscle tension, headaches, irritability, or hot flashes. Many of these individuals take medication for their disorder and require accommodations at their school or work. Their sudden attacks of panic and anxiety often result in forgetting to take medication, not remembering coping techniques, irrational fears, and general inability to remain on task. When left unaddressed, these disorders can progress to a level in which the affected person can become housebound or develop incapacitating compulsive behaviors.

Treatment with a professional typically involves medications. Often the sufferer has to endure limited life activities and disrupted social interactions and companionship Proper breathing is an important element of reducing feelings of fear, depression, and anxiety. While simple in concept, proper breathing requires education and practice. Studies have shown that proper inhaling and exhaling, if exercised at proper intervals, has measurable medical benefits to include stress reduction. Proper breathing techniques can be used to further reduce indigestion and reduce the chances of panic type anxiety attacks.

Dr. Andrew Weil, MD, an internationally recognized expert on mind-body interactions and is author of many books has offered much advice on proper breathing. Dr. Weil says: "If I had to limit my advice on healthier living to just one tip, it would be simply to learn how to breathe correctly."

An article in The Seattle Times, May 10, 2000, section C3, by Carol Krucoff, entitled: "Better living through belly breathing" stated that "Slow, deep breathing is a powerful anti-stress technique. When you bring air down into the lower portion of the lungs, where the oxygen exchange is most efficient, heart rate slows, blood pressure decreases, muscles relax, anxiety eases and the mind calms."

Experts in the field of mind-body medicine say that few people in Western, industrialized society know how to breathe correctly. We are taught to suck in our guts and puff out our chests, which causes the muscles to tense and respiration rate to increase. As a result, we are a nation of shallow "chest breathers," who primarily use the middle and upper portions of the lungs. Babies breathe from the belly, but with age, most people shift from this healthy abdominal breathing to shallow chest breathing.

Breathing is the only bodily function you can do either consciously or unconsciously. Studies have linked focused breathing with reducing hot flashes in menopausal women, relieving chronic pain and reducing symptoms of PMS (premenstrual syndrome). Some hospitals have begun teaching relaxation breathing to patients treated for a wide range of conditions.

Additional and varied health benefits that can be achieved through proper breathing:

THE RESPIRATORY SYSTEM

Gives you more energy
Reduces mental and physical fatigue.
Reduces chest pains due to tight muscles thus the tension causing anxiety of "heart attack potential" is reduced.
Aids in relief of many long term respiratory difficulties such as asthma and bronchitis.
Reduces need for artificial stimulants and many harmful prescription drugs.
Opens up the chest to make breathing easier and fuller which facilitates strengthening of the life force, emotional stability and mental clarity to feel more energetic, strengthen coping skills, increased positive energy and strengthened sense of self.
Helps eliminate waste matter.
It also influences the

CIRCULATORY SYSTEM

Improves blood circulation and relieves congestion.
Increases supply of oxygen and nutrients to cells throughout the body. Major organs such as brain, and eyes need copious oxygen.
Eases the strain on the heart by increasing oxygen to the heart.

THE NERVOUS SYSTEM

Better breathing can calm or stimulate the nervous system, balance or unbalance brain hemispheres, depending on the technique.
Better breathing opens up and balances subtle energy systems affecting all the body.

THE DIGESTIVE SYSTEM

Diaphragmatic action acts as a pump to massage the internal organs, aiding their *function; helps push the movement of lymph throughout the body which helps eliminate toxic wastes and strengthen the immune system.

THE URINARY SYSTEM

Shallow breathing puts stress on other organs of elimination.
Better breathing can reduce edema, (swelling of the body) by eliminating fluids through the breath.
*Massaging the kidneys for instance can cleanse the blood and tonify the entire system

THE SKIN

Given a complex carbohydrate diet, toxic $CO_2$ waste is eliminated more directly through breath.
Wrinkles can be lessened due to improved circulation and blood oxygen flow.
Radiant skin is observable and more pleasing to look at.

BODY, MIND AND SPIRIT

Relax deeper.
Look more rested.
Feel Nurtured and Accepted.
The core of the breath is the core of one's being.
Become more connected with one's deepest core sense of self.

OPTIMAL BREATHING

The techniques used facilitate stretching of connective tissue, which prevents formation of adhesions and reduces the danger of fibrosis (stringy tissues). Relaxes muscle spasm and relieves tension. Helps increase the supply of blood and nutrients to muscles blood and bones.
It invites internal sensing of optimal posturing that maintains body balance which supports ease of breathing including $CO_2$ elimination as well as helps to prevent muscle adhesions and fibrosity. Releases and reduces muscular tension that eventually may cause structural problems.
Helps increase flexibility and strength of joints; when you -continued breathe easier you move easier.
Can partially compensate for lack of exercise and
inactivity due to habit, illness or injury.

Copyright © 2000 Michael Grant White (This article has been reprinted here by permission Various patents related to breathing have been proposed over the years. See for example, U.S. patents: U.S. Pat. No. 6,561,987 to Pail; U.S. Pat. No. 6,267,730 to Pacunas; U.S. Pat. No. 6,212,135 to Schreiber; U.S. Pat. No. 5,454,376 to Stephens et al.; U.S. Pat. No. 5,277,194 to Hosterman et al.; and U.S. Pat. No. 4,711,585 to Fresquez et al. However, none of these devices are useful as a breathing reminder for the user.

Many of these devices require complicated and expensive components, that generally must be pre-programmed, adjusted and calibrated by the user to work and are difficult to operate. Many of these devices are large, cumbersome, and uncomfortable to wear. These devices would not be easy for elderly and young persons to operate. These devices are not desirable to the user since they are visible and obvious to others and therefore can cause a negative social stigma when being used.

Still furthermore, many of these devices emit embarrassing noisy audible and/or visible alarms so there is little or no discretion for the user. Still furthermore, adjustable settings on many of these devices can be accidentally changed if the devices are dropped or misused. Still furthermore, many of these devices can be accidentally changed simply by handling the device. Thus, there settings must be constantly monitored to work. Many of these devices require more power than simple AAA size batteries and can often burn out.

Various other timer devices have been proposed over the years. See for example, The Invisible Clock® by Time Now Corporation U.S. patents: U.S. Pat. No. 6,561,987 to Pail; U.S. Pat. No. 6,267,730 to Pacunas; U.S. Pat. No. 6,212,135 to Schreiber; U.S. Pat. No. 6,198,695 to Kirton et al.; U.S. Pat. No. 6,075,755 to Zarchan; U.S. Pat. No. 5,899,204 to Cochran; U.S. Pat. No. 5,861,797 to Becker; U.S. Pat. No. 5,454,376 to Stephens et al.; U.S. Pat. No. 5,277,194 to Hosterman et al.; U.S. Pat. No. 4,711,585 to Fresquez et al.; U.S. Pat. No. 4,617,525 to Lloyd; U.S. Pat. No. 4,493,043 to Forbath; and U.S. Pat. No. 4,258,354 to Carmon et al. However, none of these devices solve all the problems to the previously listed patents and are not suitable for simply reminding the user to practice proper breathing techniques.

Finally, an anxiety disorder sufferer's inclination is to avoid devices that require adjustments, calibrations, re-setting, and complicated instructions that require start-up procedure. Many of these devices use complicated chronometer or display, and as the device that can be dependent upon correct day, date, or time. These timer devices require storage of settings when power is removed since a spent or missing battery would remove the settings.

Thus, the need exists for solutions to the above problems with the prior art.

SUMMARY OF THE INVENTION

A primary objective of the present invention is to provide a device and method of using the device as a breathing coach to remind the user to learn and practice regulated breathing for relief of anxiety and/or stress-related conditions.

A secondary objective of the present invention is to provide a device and method of using the device as a breathing coach to assists the wearer to practice proper breathing techniques.

A third objective of the present invention is to provide a device and method of using the device as a breathing coach that is small, lightweight, hidden and discretionary to others and easy to wear.

A fourth objective of the present invention is to provide a device and method of using the device as a breathing coach, that is pre-programmed to generate a vibratory tone that is only felt by the wearer and is not heard or seen by others.

A fifth objective of the present invention is to provide a device and method of using the device as a breathing coach having fixed settings that cannot be adjusted or mistakenly reset either intentionally or by accident by the user or others.

A sixth objective of the present invention is to provide an inconspicuous and reliable reminder device having a periodic tactile alarm (a silent vibration) encased in a small housing that can be worn beneath a user's clothing.

The novel device removes the need for programming, adjusting, or calibrating while the silent tactile alarm alerts the user without the negative social stigma of an obvious, visible remedial device.

A preferred embodiment of the reminder device includes a case that is small in size so as to be comfortably worn beneath the user's clothing. The case can holds a microprocessor, a tactile alarm, and at least one battery, which provide electric power to the microprocessor and the tactile alarm. All of these components fit within the case, resulting in a device that initially appears to be a simple pocket pager.

The tactile alarm can have a single fixed vibration mode. This tactile alarm creates a vibratory sensation through the case when activated by the microprocessor. This sensation alerts the user to perform a measured breathing routine. The silent operation of this alarm assures that privacy and discretion are maintained without detracting in any way from the device's effectiveness.

When moving the switch to "ON" first activates the device, a short (4 second) alarm vibrates; followed by a 2-second pause, and then another 4-second vibrating alarm to indicate to the user that the device is activated and functional.

At 15-minute intervals, there is a 4-second vibration, followed by an 8-second pause, then another 4-second vibration. Then the cycle repeats every 15 minutes.

In recognition of an anxiety disorder sufferer's inclination to avoid devices that require adjustments, calibrations, re-setting, and complicated instructions, and this invention purposefully removed all but a single "on/off" switch and requires no start-up procedure.

As the device has no complicated chronometer or display, and as the device is not dependent upon correct day, date, or time, there is no need for storage of settings when power is removed as with a spent battery or removal of the battery compartment door 9.

Further objects and advantages of this invention will be apparent from the following detailed description of the presently preferred embodiments, which are illustrated, schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components with their reference numbers will now follow;
1. Case
2. Microprocessor
3. Batteries—two AAA batteries
4. Tactile alarm (vibrator)
   4a. Offset weight
   4b. Motor
5. Switch shaft
6. Recessed switch port
7. Clip
   7a. open bottom end of clip
   7b. upper spring connection on clip
8. Printed circuit board
9. Battery compartment door (removable)
   9a Ribbed section of battery compartment door
   9b Arrow symbol on battery compartment door
   9c "OPEN" lettering molded onto battery compartment door
   9d Interior side of battery compartment door
   9e Copper electrical contact on battery compartment door
10. "OFF" lettering molded onto case
11. "ON" lettering molded onto case
12. Battery diagram molded onto left side of case
13. Battery diagram molded onto right side of case
14. Solder connection of microprocessor to printed circuit board
15. Capacitor
16. Wire
17. Switch housing
18. Battery contact
    18a Left side
    18b Right side
19. Battery compartment
    19a Left side
    19b Right side
20. Slot in body of case to receive removable battery compartment door
21. Wire leads of motor housing
22. Screw port and component bulkhead
23. Back side perspective view of case
24. Front view of case
25. Back view of case
26. Top view of case
27. Bottom view of case
28. Left side view of case
29. Right side view of case
30. Silk screened device name
31. Device shown being worn on brassiere
32. Device shown being worn on briefs
33. Device shown being worn on waistband
34. Device shown being carried in pants pocket
35. Device shown being carried in shirt pocket Referring to FIGS. 1A through 7B, the tactile reminder device of this invention includes a case 1 holding a microprocessor 2, preferably two AAA batteries 3, and a tactile alarm, which can be made up of a motor 4a and an offset rotating weight 4. On the exterior of the case front can be a single switch 5 located in a recessed section of the case 6. The case 1 can be worn on the waistband or under clothing of the user and clipped to clothing by a spring-loaded clip 7.

Figure 1A:
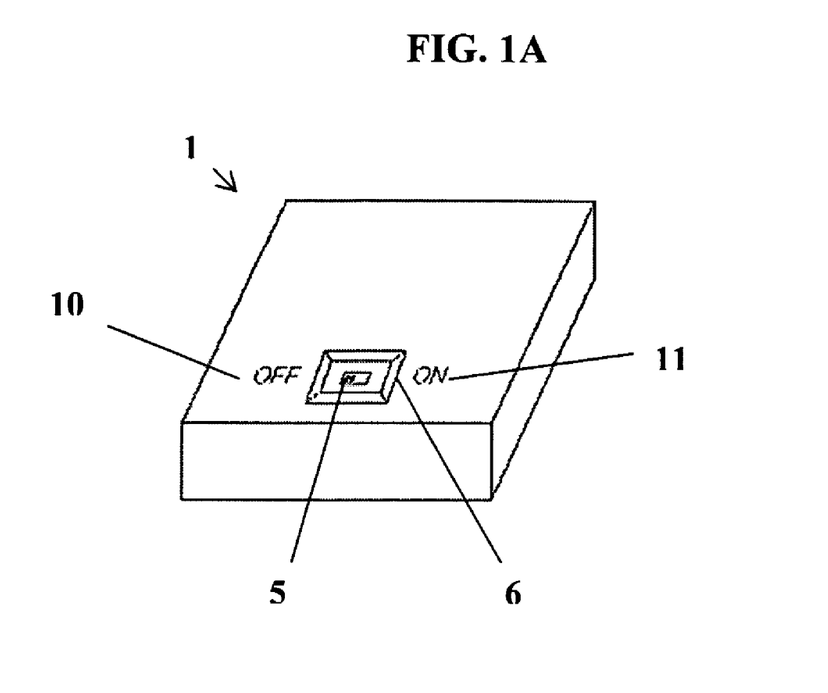
FIG. 1A is front perspective views of the tactile reminder device.
Figure 1B:
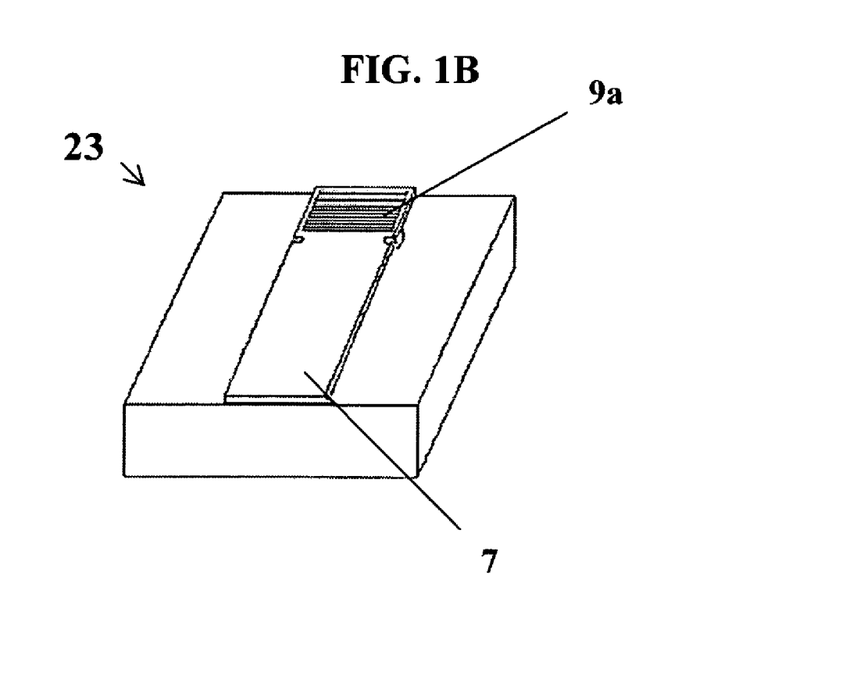
FIG. 1B is a back perspective view of the tactile reminder device of FIG. 1A.
Figure 2A:
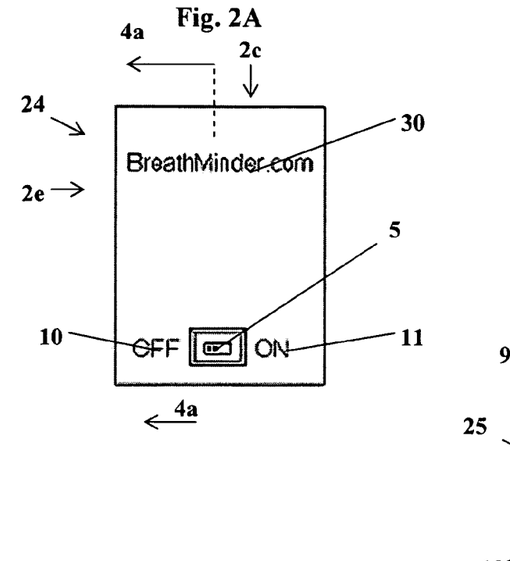
FIG. 2A is the front of the device case of FIGS. 1A–1B.
Figure 2B:
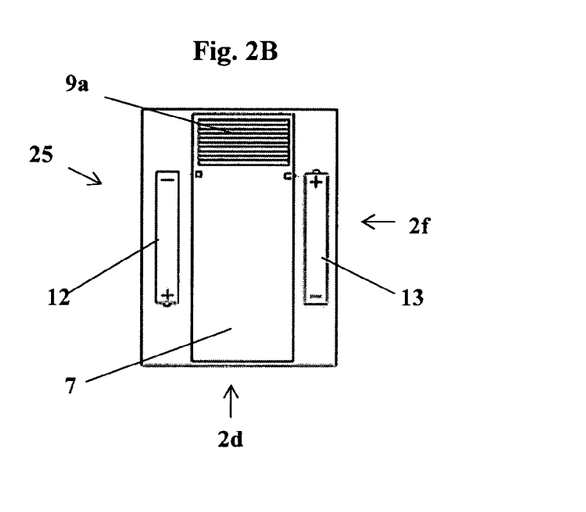
FIG. 2B is the back of the device case of FIGS. 1A–1B.
Figure 2C:
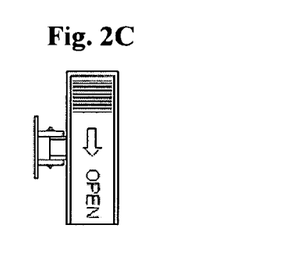
FIG. 2C is the top of the device case of FIG. 2A along arrow 2C.
Figure 2D:
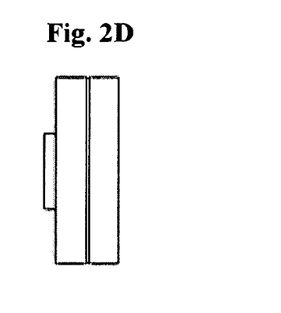
FIG. 2D is the bottom of the device case of FIG. 2B along arrow 2B.
Figures 2E, 2F:
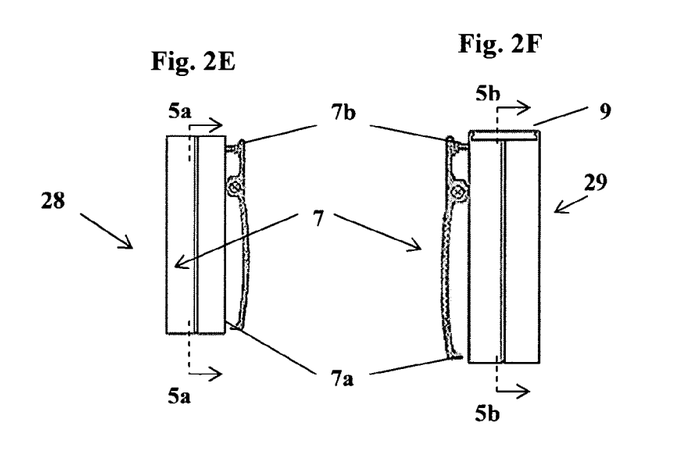
FIG. 2E is a side view of the device case of FIG. 2A along arrow 2E.
FIG. 2F is a side view of the device case of FIG. 2B along arrow 2F.
Figure 3A:
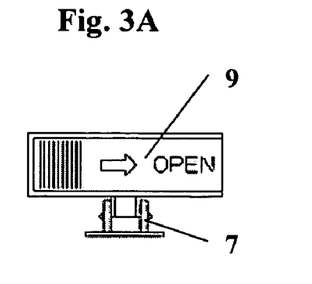
FIG. 3A is the top of the device case of FIG. 2C showing the battery compartment closed.
Figure 3B:
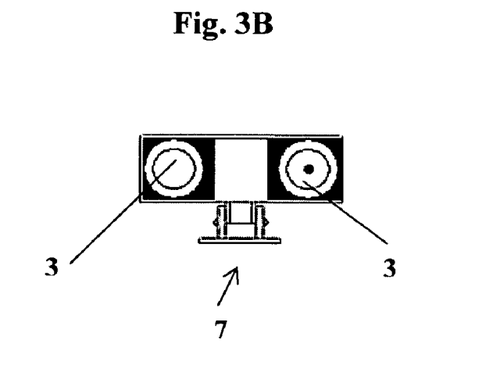
FIG. 3B is the top of the device case of FIG. 3A with battery compartment door removed.
Figure 3C:
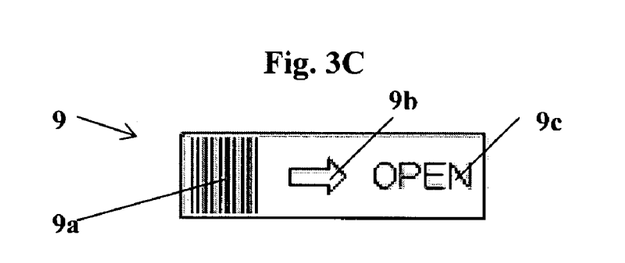
FIG. 3C is a top view of the removed battery compartment door of FIG. 3A.
Figure 3D:
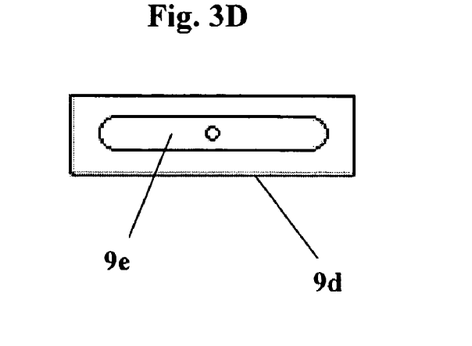
FIG. 3D is a bottom view of the underside of the battery compartment door of FIG. 3C.

FIGS. 1A and 1B shows the device's single control, a switch 5 to turn the device on or off that is located on the front face of the case 1. A recessed section 6 can be molded into the case 1 positions the switch shaft 5 in such a way as to preclude accidental activation. Switch 5 has only two positions and they are indicated on the case with molded lettering "OFF" 10 and "ON" 11. On the back face 23 of the device can be seen the spring-loaded clip 7 and ribbed thumb piece 9a. Approximate dimensions of the novel device can include a length of approximately 54 mm (approximately 2¼ inches), a depth/height of approximately 15 mm (approximately ⅝ of an inch) and a width of approximately 33 mm (approximately 1½ inches). Unlike prior art devices, the novel device can manufactured inexpensively and retail for approximately $19.95.

FIGS. 2A, 2B, 2C, 2D, 2E and 2F illustrate the novel simplification of the invention. The front view 24 shows positioning of the silk-screened device name 30 and the words "OFF" 10 and "ON" 11 as the only wording visible on the front of the case 1 on either side of switch 5. The rear view 25 of the case 1 shows two battery configurations 12 and 13 indicating proper orientation for installing batteries. Also visible in this view is the spring-loaded clip 7, which features a ribbed section 9a to provide traction when manipulating the clip. Top 26 and bottom 27 views show location of clip 7 as well as the removable battery compartment door 9. Right side 28 and left side 29 views show location of clip 7 and removable battery compartment door 9.

FIGS. 3A, 3B, 3C and 3D show the top edge of case 1 and location of removable battery compartment door 9 and location of clip 7. There can be molded lettering "OPEN" 9c along with an arrow symbol 9b and a ribbed section 9a to provide traction to the user's finger when manipulating to open and/or close. On the interior surface of the removable battery compartment door 9d is a copper piece 9e that provides electrical connection to complete the device's circuit when properly closed. The battery compartment is shown both open and closed with the open view showing batteries 3 installed in proper position.

Figure 4A:
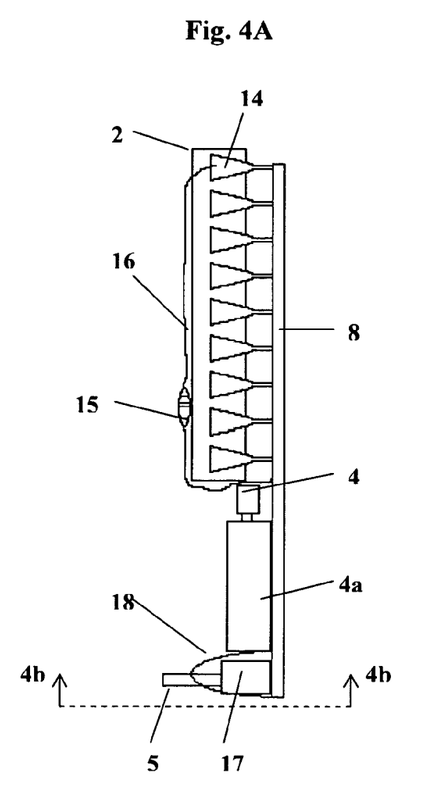
FIG. 4A is a cross-sectional cut-away view of the internal components of the device case of FIG. 2A along arrows 4A.
Figure 4B:
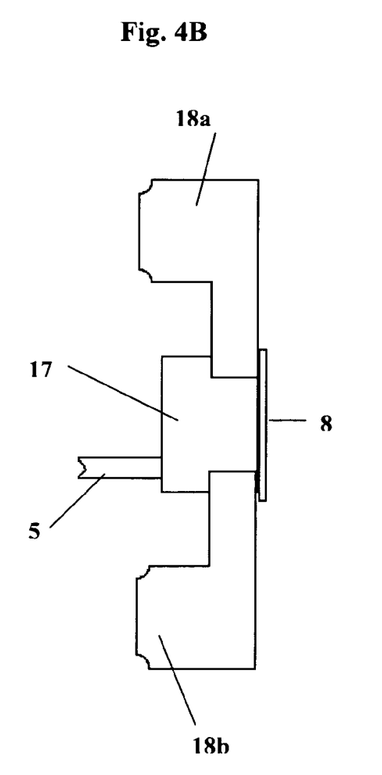
FIG. 4B is a cross-sectional cut-away view of the battery contacts and switch of FIG. 4A along arrows 4B.

FIGS. 4A and 4B shows the internal components as installed into the device. Microprocessor 2 can be attached to printed circuit board 8 with a series of solder connections as depicted by 14. A capacitor 15 is connected by wire 16 to complete the circuit. The switch shaft 5 can protrude from switch housing 17 to activate the device when batteries make contact with copper contact tab 18. Identical copper contact tabs 18a & 18b are found at the one end of each battery compartment.

Figure 5A:
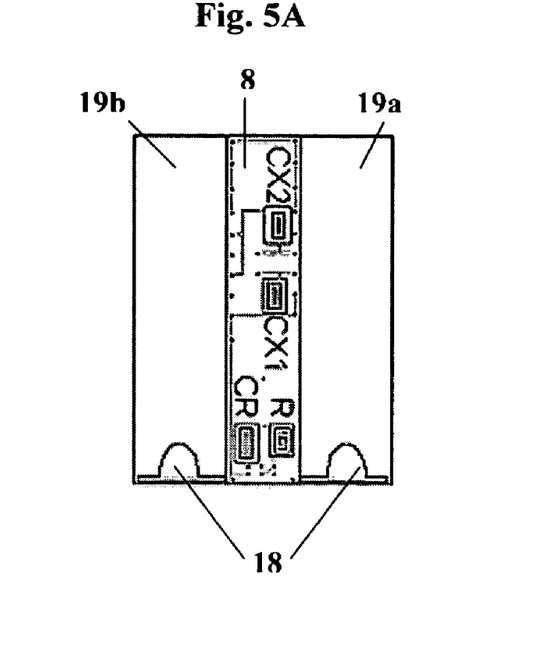
FIG. 5A is a cross-sectional cut-away view of FIG. 2E along arrows 5A showing the internal components installed within the device.
Figure 5B:
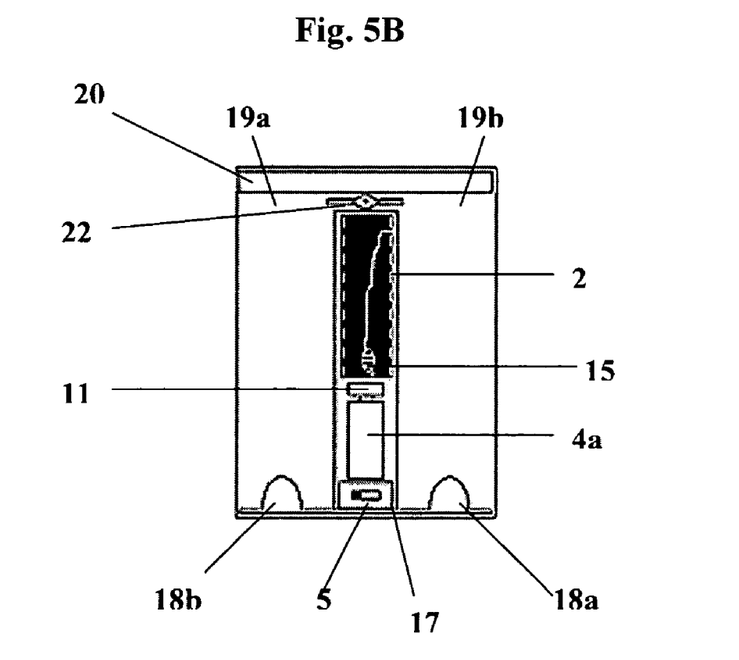
FIG. 5B is a cross-sectional cut-away view of FIG. 2F along arrows 5B showing the internal components installed within the device.

FIGS. 5A and 5B show the location of internal components of the device in both dorsal and ventral views. The microprocessor 2 that regulates the time interval and activates the tactile alarm 4 & 4a is mounted next to the offset weight 4 and the motor 4a within the case 1 and soldered 14 to printed circuit board 8. The microprocessor 2 receives electrical power from the two batteries 3, housed in battery compartments 19a & 19b along each side of case 1 flanking the printed circuit board 8, the tactile alarm 4 and 4a, capacitor 15, the microprocessor 2, and switch 5 extending from switch housing 17 located in the center of the case. The batteries 3 can be standard component, such as AAA Eveready Part No. E92, and provides power to all the electrical components in the tactile reminder device 1. Battery compartment door 9 slides into a channel 20 at one end of the case 1 to complete the electrical circuit. A screw port doubles as a securing bulkhead 22 to firmly secure internal components.

Figure 6A:
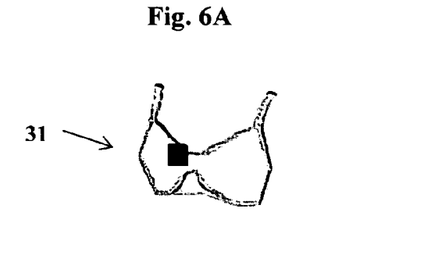
FIG. 6A shows the device of the preceding figures being worn on a brassiere.
Figure 6B:
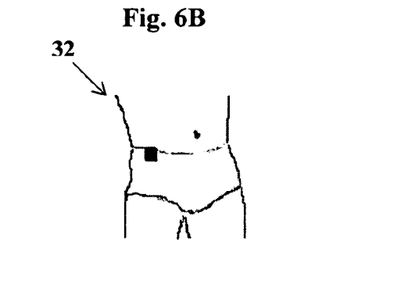
FIG. 6B shows the device of the preceding figures being worn on briefs.
Figure 6C:
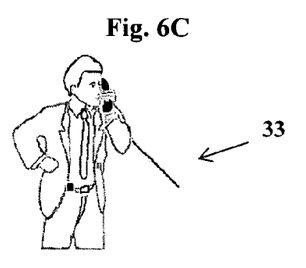
FIG. 6C shows the device of the preceding figures being worn on a waistband.
Figure 6D:
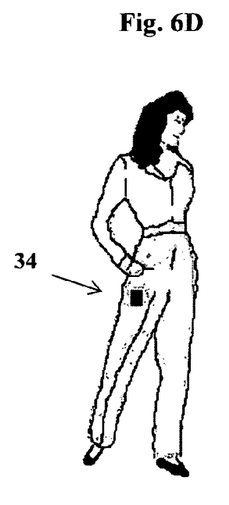
FIG. 6D shows the device of the preceding figures carried in a pants pocket.
Figure 6E:
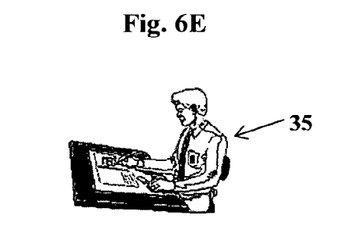
FIG. 6E shows the device of the preceding figures carried in a shirt's pocket.

FIGS. 6A–6E shows some of the ways the device can be worn in an unobtrusive fashion such as clipped to the user's undergarment 31(FIG. 6A) & 32(FIG. 6B), on user's waistband 33(FIG. 6C), in a pants pocket 34(FIG. 6D), or in a shirt pocket 35(FIG. 6E).

FIGS. 6A–6E show that the device is designed to be worn as close to the body as possible: the vibration is soft so as to be discreet, so the user is more apt to be properly cued if the device is as close to skin as practical.

Figure 7A:
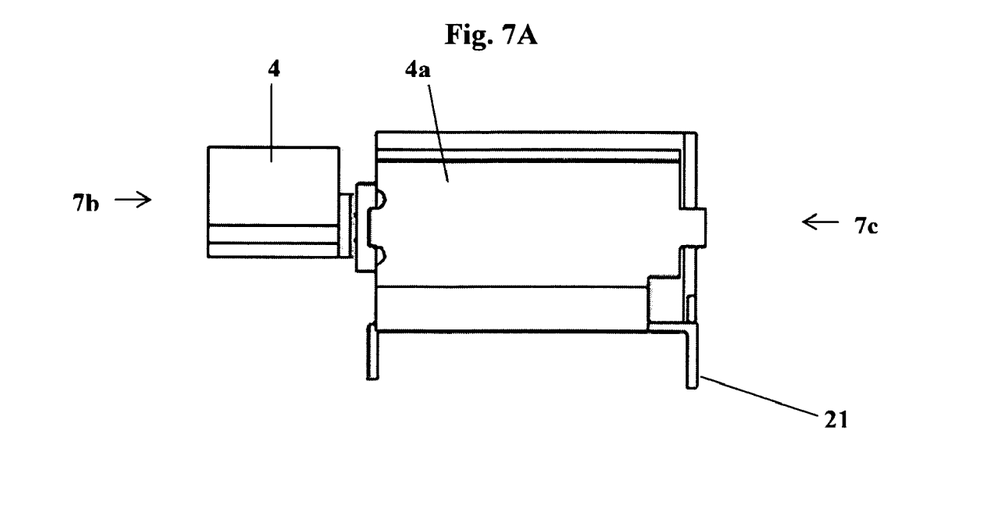
FIG. 7A shows the tactile alarm (vibrator) motor used in the device of the preceding figures that provides the silent alarm.
Figure 7B:
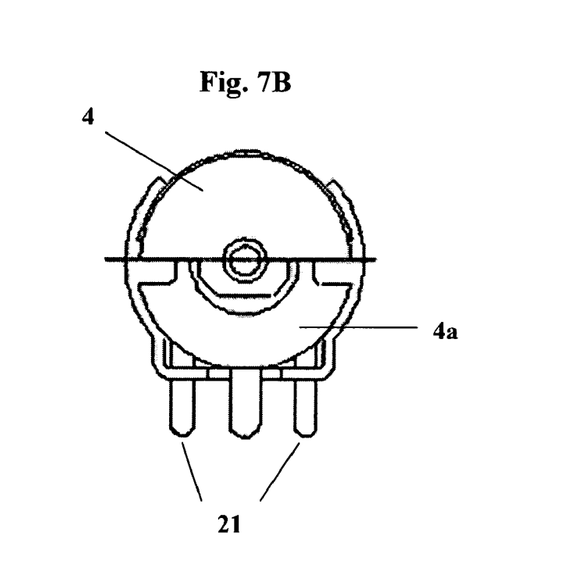
FIG. 7B is an end view of the tactile alarm (vibrator) motor of FIG. 7A along arrow 7b.
Figure 7C:
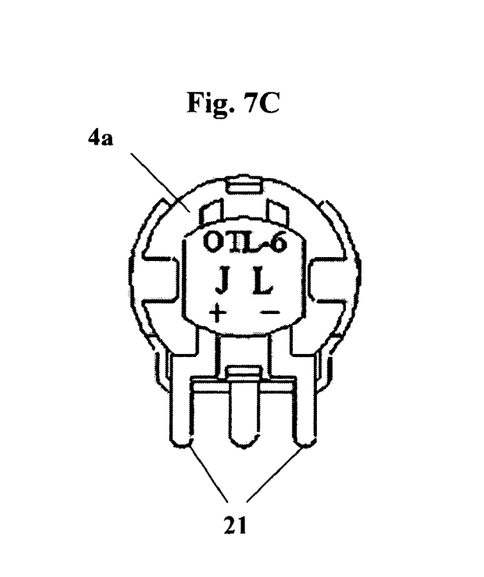
FIG. 7C is an opposite end view of the tactile alarm (vibrator) motor of FIG. 7A along arrow 7c.

FIGS. 7A, 7B and 7C shows the tactile alarm, which can be made up of motor 4a and unbalanced weight 4 attached to its drive shaft. Tactile alarm 4 & 4a is installed inside the case 1, and is controlled by microprocessor 2 and powered by batteries 3 through two electrical connections 21 mounted on the rear of the motor housing. A suitable tactile alarm is of the type often utilized in electronic paging devices and cellular telephones. The tactile alarm 4 & 4a is rigidly attached to the centermost part of the case 1 in order to ensure the transfer of a maximum amount of vibration energy through the case 1 to the user.

The novel device can be pre-programmed at the factory to have both an activation sequence indicator, as well as fixed settings for activating the vibration sequence after preselected timed intervals.

When moving the switch to "ON" first activates the device, a short (approximately 4 second) alarm vibrates; followed by an approximately 2-second pause, and then another approximately 4-second vibrating alarm to indicate to the user that the device is activated and functional.

At approximately 15-minute intervals, there can be an approximately 4 second vibration, followed by an approximately 8 second pause, then another approximately 4 second vibration. Then the cycle repeats every approximately 15 minutes.

The second alarm in the pair of alarms is for the purpose of ensuring the initial alarm was not missed or ignored by user. And, in that context, the reason behind a pair of alarms upon activating the device is to demonstrate to the user that there will be a pair of alarms and also to familiarize the user with how the vibration feels—all so that users have an idea of what to be expecting 15 minutes after activation.

BreathMinder will remind the user every 15 minutes to practice proper breathing technique (as shown in Steps 1 through 7 below.) Each 15 minutes, BreathMinder has a vibrating alarm with a pause and a second vibrating alarm. The second alarm is a backup in the event the user did not detect the first alarm or that the user ignored the first alarm.

At 15-minute intervals, the device will vibrate for 4 seconds, pause for 8 seconds, and then vibrate again for 4 seconds. Each 15 minutes has the alarm-pause-alarm cycle. Research has indicated that the typical user of such an alarm device will often be otherwise occupied at the exact moment of the reminder alarm and not be able to respond appropriately. By having a second reminder, the user will be more likely to respond to the alarm with the requisite breathing sequences.

An additional benefit of the so-called "nag alarm," is the savings of power consumption. Rather than having a 30-second continuous vibrating alarm as originally designed, changing to the dual 4-second alarms with pause produced the additional benefit of lower battery consumption. The lower consumption not only extends the battery life, but the reduced alarm activation will also extend the life of the motor and vibration component.

A walk through example of using the novel invention is described below.

1. Sit up comfortably and place the tip of your tongue against the bony ridge near your upper front teeth; you'll keep your tongue in this position throughout the exercise.
2. Exhale with a whoosh through your mouth and empty your lungs.
3. Now close your mouth and breathe in quietly through your nose to the count of four.
4. Hold your breath easily to the count of seven.
5. Exhale through your mouth with a whoosh to the count of eight.
6. You have now completed one breath. Repeat the cycle three more times for a total of four breaths. Do not do more than four breaths at one time for the first month of practice. Over time, you can workup to eight breaths. While you may notice only a subtle effect at first, breathwork gains power through repetition and practice. Make a point to practice each time BreathMinder reminds you with a (vibrating) alarm.

7. Over time, proper breathing will become your natural way of breathing.

The goal is to make sure that every 15 minutes, the user practices the technique by taking a series of measured breaths (#1 thru #7 above.) There is a pair of alarms each 15 minutes. The duration of the alarm and the length of the pause have nothing to do with the breathing technique. The length of the alarm and the length of the pause were calculated to achieve maximum reminder effect (not too long & not too brief); the pause was made just long enough to lend more emphasis to the second ("Nag") alarm.

The "nag" feature of this alarm is unique from all known prior art in that no other alarm, other than the "snooze" feature on a standard bedside alarm clock, has such a feature. Like the "snooze" feature at bedside, the Breathminder device's "nag" feature follows a known human trait of responding to a reminding second alarm.

Research shows that it a typical human response to a recurring alarm is to begin to ignore that alarm after many repetitions. With an alarm that will pause and then alarm again within just 8 seconds' time, the user is much more likely to respond to the reminder than with a single alarm. As the Breathminder's alarm is a discreet, silent vibration, it is possible for the vibration to be missed due to the user's posture or activity at the time of alarm. Having a second alarm after a short interval pause is important to the purposes of the health plan that is linked to the alarm cycle.

Another run-through of using the invention is as follows:
1) Begin by lying flat on your back or standing up straight. You may also sit up straight in a chair, if that is more comfortable.
2) Place one hand on your stomach area and one hand on your chest.
3) Breathe as you normally would and notice whether your "stomach" hand rises or your "chest" hand rises.
4) To breathe properly, your stomach area must rise more than your chest as your diaphragm expands.
5) To learn to breathe correctly, begin by slowly breathing in through your nose through the count of 4.
6) Hold the breath for a count of 7.
7) Slowly exhale through your mouth for a count of 8. (Some call this 4-7-8 breathing.) When you exhale, try to make a soft "whoosh" sound by holding the tip of your tongue against the roof of your mouth (or lightly clench your teeth) as you exhale slowly.
8) Repeat this process for three more times (for a total of four breaths.) Do not do more than four breaths at first—with practice, you can work your way up to eight breaths. Do this twice each day.
9) If the process causes you to begin panicking, only do it for as long as you are able.
10) Increase the number of breaths each day until you can do the exercise for at least eight breaths twice per day.
11) If you continue to practice breathing this way, you will soon be doing it naturally throughout the day.
12) An additional benefit will be that once you are familiar with the exercise, you can do it while experiencing anxiety or the beginning of a panic attack, and you will feel relief.

Although the invention has been described for use as a breathing reminder, the invention can have other novel applications. For example, the invention can be used to remind one to do stretches, standup and the like. Office workers and those that sit at desks for long periods of time can be reminded with the device to get up and do stretching and do backaches, and reduce back pain problems, enhance blood flow, and the like, by using the novel reminder device. Other reminder activities can be to remind users to schedule fluid intake, hydrate, do affirmations (such as the serenity prayer, and the like), which has use as an inexpensive psychotherapy.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A breathing reminder device adapted for reminding a user to practice measured breathing, comprising:
    a plastic housing having no visual displays;
    a tactile vibration alarm in the housing that is pre-set with fixed setting that are factory programmed to solely emit an identical vibration sequence cycle at approximately every 15-minute intervals, the tactile vibration alarm not emitting any vibration emissions during the 15 minute intervals;
    a battery positioned inside the housing for supplying power to the tactile alarm;
    a single switch for activating both the power supply and the tactile vibration alarm, the housing having no other switches, the single switch for immediately activating a vibration activating sequence when the single switch is turned on indicate to the user that the device is ready to operate; and
    an attachment portion for attaching the housing to a user, wherein activation of the alarm at the selected timed intervals is a reminder to the user to practice measured breathing.

2. The reminder device of claim 1, wherein the attachment portion includes:
    a clip for attaching the housing to a belt worn by the user.

3. The reminder device of claim 1, wherein the activation sequence includes:
    a continuous vibration over a first short time period followed by a silence over another short time period followed by another continuous vibration over a second short time period.

4. The reminder device of claim 3, wherein the first short time period for the continuous vibration is approximately 4 seconds, the silence time period is approximately 2 seconds and the second short time period for the another vibration is approximately 4 seconds.

5. The reminder device of claim 1, wherein the vibration sequence cycle includes:
    an approximately 4 second vibration, followed by an approximately 8 second pause, followed by another approximately 4 second vibration, wherein the vibration sequence cycle repeats every approximately 15 minutes.

6. The reminder device of claim 1, wherein the battery includes:
    two AAA batteries.

7. A breathing reminder device, comprising:
    a case sized adapted to be worn under the clothing of a user, the case having no visual displays;
    a pre-programmed microprocessor, a tactile vibratory alarm, and AAA batteries within the case, the batteries supplying power to the microprocessor and the tactile alarm, wherein the pre-programmed microprocessor is pre-set with fixed settings that are factory programmed, to activate and to solely emit an identical vibratory sequence from the tactile vibratory alarm at approximately every 15 minute intervals to remind the user to practice breathing at every 15 minute intervals, the tactile vibratory alarm emitting no vibration emissions during the 15 minute intervals, and the case having only a single activation switch.

8. The reminder device of claim 7, wherein each vibratory sequence includes:
an approximately 4 second vibration followed by an approximately 8 second pause followed by another approximately 4 second vibration.

9. A method of reminding users to practice a body function, comprising the steps of:
providing a discrete case that houses a pre-programmed tactile alarm with fixed settings that are factory programmed the case having no visual displays, and the case having an internal power supply for the alarm;
attaching the case discretely to a user;
turning the alarm to an onstate solely with a single switch, the case having no other switch;
immediately activating a single vibration activating sequence when the single switch is turned on indicate to the user that the device is ready to operate; and
continuously activating an identical vibratory alarm sequence from the tactile alarm that is activated to emit at approximately every 15 minute intervals, wherein the vibratory alarm allows the user to practice body measured breathing at approximately every 15 minute intervals.

10. The method of claim 9, wherein the activating of the vibratory sequence step includes the steps of:
emitting a first continuous vibration over a first time period;
pausing vibratory emissions after the first time period; and
emitting a second continuous vibration after the pause, wherein the vibratory sequence is repeated at the selected periods.

11. The method of claim 9, wherein the steps of the immediately activating of the vibratory sequence step includes the steps of:
emitting a first continuous vibration over approximately 4 seconds;
emitting silence after the first vibration for approximately 8 seconds; and
emitting a second continuous vibration after the pause for approximately 4 seconds, wherein the vibratory sequence is repeated every approximately 15 minutes.

12. The method of claim 9, wherein the step of attaching includes the step of:
clipping the case onto the belt of the user.

* * * * *